United States Patent
Jeong et al.

(10) Patent No.: US 12,482,884 B2
(45) Date of Patent: Nov. 25, 2025

(54) BATTERY PACK

(71) Applicant: SK On Co., Ltd., Seoul (KR)

(72) Inventors: Won Seok Jeong, Daejeon (KR); Hae Ryong Jeon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 27 days.

(21) Appl. No.: 18/523,160

(22) Filed: Nov. 29, 2023

(65) Prior Publication Data
US 2024/0186624 A1    Jun. 6, 2024

(30) Foreign Application Priority Data
Dec. 1, 2022 (KR) .................. 10-2022-0166103

(51) Int. Cl.
*H01M 50/143* (2021.01)
*H01M 50/15* (2021.01)
(Continued)

(52) U.S. Cl.
CPC ......... *H01M 50/143* (2021.01); *H01M 50/15* (2021.01); *H01M 50/209* (2021.01); *H01M 50/291* (2021.01)

(58) Field of Classification Search
None
See application file for complete search history.

(56) References Cited

U.S. PATENT DOCUMENTS

2003/0232239 A1* 12/2003 Gow ................ H01M 10/6557
429/153

2007/0164711 A1* 7/2007 Kim ................... H01M 10/6595
320/149
(Continued)

FOREIGN PATENT DOCUMENTS

DE    102013216296 A1    2/2015
EP     3573169 A1    11/2019
(Continued)

OTHER PUBLICATIONS

Balabanovich, "The effect of melamine on the combustion and thermal decomposition behaviour of poly(butylene terephthalate)", Polymer Degradation and Stability, 2004, pp. 451-458, vol. 84.
(Continued)

*Primary Examiner* — Haixia Zhang
(74) *Attorney, Agent, or Firm* — The Webb Law Firm (57) ABSTRACT

Provided is a battery pack including a battery module including one or more battery cells; an accommodating body accommodating the battery module; an accommodating cover coupled to the accommodating body to form, together with the accommodating body, a module accommodating space in which the battery module is accommodated; a fire extinguishing portion provided in the accommodating cover and supplying a fire extinguishing agent accommodated therein to the module accommodating space when the temperature of the module accommodating space is equal to or higher than a preset first temperature; and a variable portion which is located between the battery module and the fire extinguishing portion and of which shape or length is changed to expose the fire extinguishing portion toward the battery module when the temperature of the module accommodating space reaches a preset second temperature which is lower than the first temperature.

18 Claims, 6 Drawing Sheets

(51) Int. Cl.
*H01M 50/209* (2021.01)
*H01M 50/291* (2021.01)

(56) References Cited

U.S. PATENT DOCUMENTS

| | | | |
|---|---|---|---|
| 2021/0351471 A1* | 11/2021 | Choi | H01M 50/282 |
| 2023/0268612 A1* | 8/2023 | Lee | A62C 3/07 |
| | | | 429/156 |
| 2023/0291064 A1* | 9/2023 | Kim | H01M 50/30 |

FOREIGN PATENT DOCUMENTS

| | | |
|---|---|---|
| KR | 100611556 B1 | 8/2006 |
| KR | 1020120136830 A | 12/2012 |
| KR | 1020160020234 A | 2/2016 |
| KR | 1020200141918 A | 12/2020 |
| KR | 1020220075710 A | 6/2022 |

OTHER PUBLICATIONS

Song et al., "Experimental study on fires extinguishing properties of melamine phosphate powders", Procedia Engineering, 2014, pp. 535-542, vol. 84.

* cited by examiner

BATTERY PACK

CROSS-REFERENCE TO RELATED APPLICATION

This application claims priority to Korean Patent Application No. 10-2022-0166103 filed Dec. 1, 2022, the disclosure of which is hereby incorporated by reference in its entirety.

BACKGROUND OF THE INVENTION

1. Field of the Invention

The present disclosure relates to a battery pack comprising a battery module comprising an assembly of secondary batteries or battery cells. More specifically, it relates to a battery pack comprising an independent fire extinguishing function for each battery module.

2. Description of the Related Art

Secondary batteries, unlike primary batteries, are not only capable of charging and discharging but also environment-friendly and economically feasible (high capacity and long lifespan), and so their business areas are expanding into new application fields. With the expansion of portable devices, including mobile devices, and the development of electric vehicles, intelligent robot industries, and eco-friendly energy industries, the industry of secondary battery, which is a core component of these industries, is also developing.

Among secondary batteries, lithium secondary batteries have outstanding advantages in capacity, weight, self-discharge, and memory effect compared to the conventional nickel-based batteries, such as nickel cadmium batteries or nickel hydrogen batteries. Therefore, lithium secondary batteries are dominating the entire secondary battery market.

The operating principle of a lithium secondary battery is an electrochemical oxidation-reduction reaction. In other words, the principle is that electricity is generated by the movement of lithium ions and charged in an opposite process. In a lithium secondary battery, lithium ions escape from an anode and go to a cathode through an electrolyte and a separator, which is referred to as discharge, and the opposite process is referred to as charging.

However, social concerns about the safety of battery use are increasing due to recent fires or explosions that occurred during the use of lithium secondary batteries. Due to these social concerns, one of the recent major development tasks of lithium secondary batteries is to eliminate instabilities such as fire and explosion caused by thermal runaway of battery cells.

To this end, Korean Patent Publication No. 10-2016-0020234 discloses a sensor for detecting fire in a battery pack of a vehicle; and a gas generating unit located at the front and rear of the battery pack to supply an inert gas to the battery pack. However, fire suppression may not be efficiently carried out because an independent fire extinguishing function may not be performed by specifying only a battery module in which a fire has occurred, and an inert gas is supplied to the entire battery pack. In addition, a fire may not be detected due to a malfunction or failure of the sensor.

SUMMARY OF THE INVENTION

First, a technical problem of the present disclosure is, when a fire occurs in a specific battery module provided in a battery pack, to prevent propagation of the fire in the specific battery module to other battery modules or to retard the propagation.

Second, another technical problem of the present disclosure is to supply a non-flammable fire extinguishing agent to the battery module in which the fire has occurred.

Third, another technical problem of the present disclosure is to reduce the volume of a fire extinguishing agent to efficiently utilize the space in the battery module.

Fourth, another technical problem of the present disclosure is to configure a fire extinguishing portion of a battery module in which a fire has occurred to operate by a physical and chemical reaction of a material itself according to temperature without using a sensor.

To this end, the present disclosure may comprise a fire extinguishing device for each battery module so that each battery module can have an independent fire extinguishing function. In addition, according to the present disclosure, a fire can be rapidly detected and dealt with through a change in a material at a temperature rise, rather than detecting a fire by using a sensor.

Specifically, the battery pack described in the present disclosure comprises a battery module comprising one or more battery cells; an accommodating body accommodating the battery module; an accommodating cover coupled to the accommodating body to form, together with the accommodating body, a module accommodating space in which the battery module is accommodated; a fire extinguishing portion provided in the accommodating cover and configured to supply a fire extinguishing agent accommodated therein to the module accommodating space when the temperature of the module accommodating space is equal to or higher than a preset first temperature; and a variable portion which is located between the battery module and the fire extinguishing portion and of which shape or length is changed to expose the fire extinguishing portion toward the battery module when the temperature of the module accommodating space reaches a preset second temperature which is lower than the first temperature.

The fire extinguishing portion may be located at an inner surface of the accommodating cover facing the battery module, and the variable portion may be located at the inner surface of the accommodating cover to cover at least a portion of the fire extinguishing portion.

The accommodating cover may further comprise a recessed portion recessed in a direction away from the battery module, and the fire extinguishing portion may be located in the recessed portion.

The accommodating cover comprises an insulating part located toward the battery module from an inner surface of the accommodating cover; and a recessed portion formed by recessing the insulating part in a direction away from the battery module, wherein the fire extinguishing portion may be located in the recessed portion.

Meanwhile, the variable portion may comprise or be made of a thermally contracting material.

The variable portion may be attached to and stacked on an inner surface of the recessed portion at a temperature equal to or higher than the second temperature.

The insulating part may be inclined toward the fire extinguishing portion. The insulating part may be inclined toward the fire extinguishing portion from the circumference of the insulating part toward the center of the insulating part.

The fire extinguishing portion may comprise a fire extinguishing accommodating portion comprising a fire extinguishing agent therein, wherein the fire extinguishing accommodating portion may supply the extinguishing agent to the outside of the fire extinguishing accommodating portion at a temperature equal to or higher than the first temperature.

The fire extinguishing agent may be a liquid or a solid in the form of powder.

The fire extinguishing agent may comprise any one selected from sodium azide, a phosphorus-based compound, a nitrogen-based compound, a silicon-based compound, a halogen-based compound, or a metal hydrate-based compound.

The fire extinguishing agent may generate a non-flammable gas in the module accommodating space.

The variable portion may comprise or be made of an electrically insulating material.

The variable portion may be stacked on an inner surface of the fire extinguishing portion and the accommodating cover.

The variable portion has an area where the fire extinguishing portion is exposed toward the battery module may be changed from a predetermined first area to a predetermined second area, which is larger than the predetermined first area, at a temperature equal to or higher than the second temperature.

The variable portion may be melted at a temperature equal to or higher than the second temperature.

The variable portion may move from a preset first position to a preset second position at a temperature equal to or higher than the second temperature.

Meanwhile, the battery module, the module accommodating space, the fire extinguishing portion, and the variable portion are each provided in plurality; each of the plurality of module accommodating spaces accommodates any one battery module of the plurality of battery modules; and the plurality of fire extinguishing portions and the plurality of variable portions may also be spaced apart from any one battery module of the plurality of battery modules.

The accommodating body may comprise a compartment portion to form each of the plurality of module accommodating spaces.

As described above, according to the present disclosure, first, when a fire occurs in a specific battery module, propagation of the fire to other battery modules may be retarded, or the propagation of the fire may be reduced or prevented.

Second, according to the present disclosure, the partial pressure of oxygen inside the battery module where a fire has occurred may be lowered.

Third, according to the present disclosure, malfunction and time retardation that may occur when detecting a fire may be reduced.

DESCRIPTION

Hereinafter, preferred Examples of the present disclosure will be described in detail with reference to the accompanying drawings. The configuration or control method of a device to be described below is only for explaining an Example of the present disclosure, but is not intended to limit the scope of the present disclosure, and the same reference numerals used throughout the specification indicate the same components.

Specific terminology used in this specification is only for convenience of description and is not used as a limitation of Examples.

For example, expressions such as "the same" and "identical" not only represent strictly the same state but also represent a state where there is a tolerance or a difference in the degree to which the same function is obtained.

For example, expressions indicating a relative or absolute arrangement, such as "in a certain direction," "along a certain direction," "side by side," "vertically," "center," "concentric" or "coaxial," not only strictly represent such an arrangement but also represent a state of relative displacement with a tolerance or an angle or distance to the extent that the same function is obtained.

The present disclosure is described below with reference to a spatial Cartesian coordinate system with X, Y, and Z axes that are orthogonal to each other. Each axial direction (X-axis direction, Y-axis direction, Z-axis direction) means both directions in which each axis extends.

The X-direction, Y-direction, and Z-direction mentioned below are for explanation so that the present disclosure can be clearly understood, and each direction may be defined differently depending on where the reference is placed.

The use of terms with expressions, such as 'first,' 'second,' and 'third' in front of the components mentioned below, is only to avoid confusion between the components referred to, and is irrelevant to the order, importance or master-servant relationship between the components, and the like. For example, an invention comprising only a second component without a first component can be implemented.

Singular expressions used in the present specification include plural expressions unless the context clearly dictates otherwise.

Figure 1:
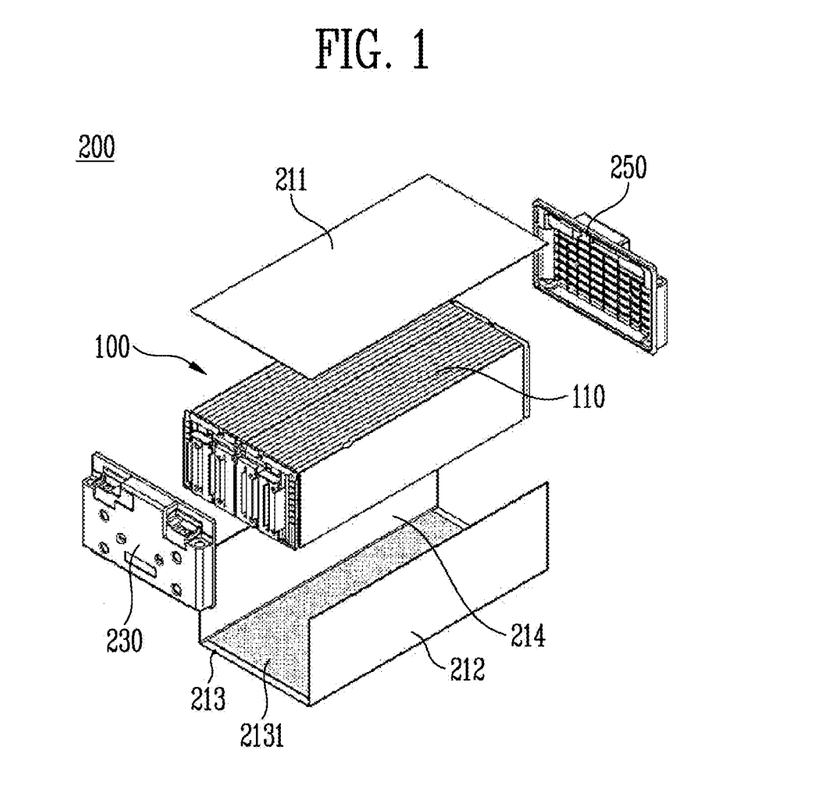
FIG. 1 is an exploded view of a battery module.

FIG. 1 is an exploded view of a battery module 200. A battery cell described in the present specification refers to a basic unit of a lithium secondary battery, specifically, a lithium ion battery, which can be used by charging and discharging electric energy. The main components of a battery cell comprise a cathode, an anode, a separator, and an electrolyte, and a battery cell is made by putting these main components into a case (or pouch). The battery cell may further comprise a tab that is connected to the cathode and the anode, respectively, and that protrudes to the outside of the pouch for electrical connection with the outside.

Meanwhile, a battery module described in the present specification refers to a battery assembly in which one or more battery cells are bundled together and put into a case to protect the battery cells from external shock, heat, vibration, and the like.

A battery pack refers to a set in which a preset number of the battery modules are gathered for a finally desired voltage or power.

Referring to FIG. 1, a battery module 200 may comprise one or more battery cells 110 and a bus bar assembly (not shown) that is electrically connected to the battery cells 110. The battery module 200 may comprise a bus bar assembly for electrically integrally connecting the plurality of battery cells 110 after the plurality of battery cells 110 are stacked.

Referring to FIG. 1, the length of the battery cell 110 in a first direction, which is any one of directions perpendicular to the height direction, may be longer than the length of the battery cell 110 in a second direction which is the height direction perpendicular to the first direction and the height direction. This is to improve the safety of a vehicle by lowering the center of gravity of a battery pack in the vehicle where many battery cells 110 are used. A battery cell of a such rectangular shape may be referred to as a long cell.

In the present specification, to define the other two directions except for the height direction (Z-direction) in three dimensions, the longest direction of the battery cell 110 or the battery module 200 was determined as a first direction, and a direction perpendicular to the first direction and to the height direction was determined as a second direction.

Referring to FIG. 1, a cell assembly 100 comprises one or more battery cells 110; and a bus bar assembly which is located on both sides of the battery cells along the second direction to be electrically connected to the one or more battery cells.

The battery module provides a space in which the cell assembly 100 is accommodated. The battery module 200 has both sides open along the first direction to accommodate the cell assembly 100, and may comprise a cell accommodating body (not shown) of an angled U-shape with an open top face or of a channel shape with an open top.

The cell accommodating body (not shown) may further comprise a module bottom panel 213 forming a bottom face; and a module first side panel and a module second side panel 214 extending upward from both edges parallel to the first direction among edges of the module bottom panel 213.

The battery module 200 may further comprise a heat dissipation part 2131 provided on the module bottom panel 213 and contacting the cell assembly 100. The heat dissipation part 2131 is to rapidly discharge the heat generated from the cell assembly 100 to the outside.

For example, the heat dissipation part 2131 may be provided as a heat dissipation pad or a thermal adhesive.

The battery module 200 may further comprise a module top panel 211 (or a module cover) coupled to the top portion of the cell accommodating body. The battery module 200 may have a rectangular parallelepiped shape accommodating the cell assembly 100 therein.

Meanwhile, the battery cell 110, as a secondary battery, may be a pouch type secondary battery (or battery cell), a prismatic secondary battery, or a cylindrical secondary battery. In the present specification, the drawings illustrate a pouch type battery cell as an example but are not limited thereto.

Figure 2:
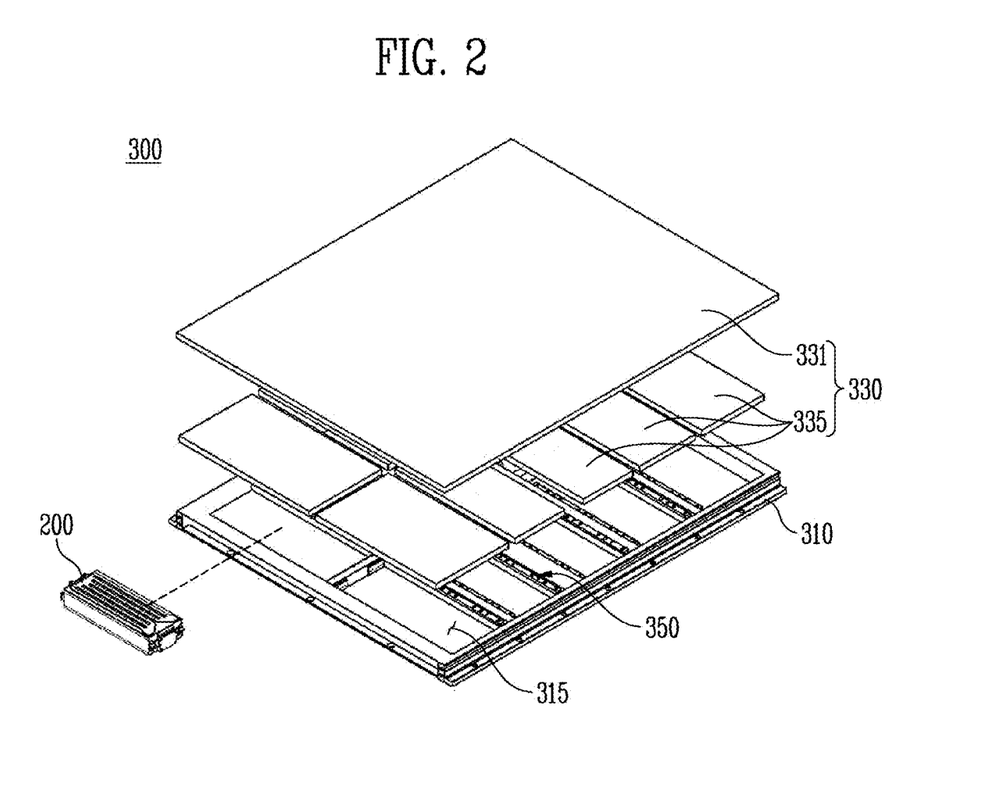
FIG. 2 schematically illustrates an exploded view of a battery pack described in the present disclosure.

Referring to FIG. 2, the battery pack 300 comprises a battery module 200 comprising one or more battery cells 110; an accommodating body 310 accommodating the battery module 200; an accommodating cover 330 coupled to the accommodating body 310 to form, together with the accommodating body, a module accommodating space 315 in which the battery module 200 is accommodated; a fire extinguishing portion 400 (see FIG. 3) provided on the accommodating cover 330 to supply a fire extinguishing agent 420 (see FIGS. 4A and 4B) accommodated therein to the module accommodating space 315 at a temperature of the module accommodating space 315 equal to or higher than a preset first temperature and/or a fire extinguishing portion 400 supplying a non-flammable gas to the module accommodating space 315; and a variable portion 3352 (see FIGS. 4A and 4B) which is located between the battery module 200 and the fire extinguishing portion 400 and of which shape or length is changed to expose the fire extinguishing portion 400 toward the battery module 200 when the temperature of the module accommodating space 315 reaches a preset first temperature.

The accommodating body 310 may form a module accommodating space 315 in a rectangular shape to accommodate the battery module 200 therein.

The accommodating body 310 may comprise a bottom face (not shown) of the accommodating body that forms a bottom face; and a side face of the accommodating body that extends upwards from a corner of the bottom face of the accommodating body to form the module accommodating space 315.

Since the module accommodating space 315 may be formed by a bottom face of the accommodating body and a side face of the accommodating body, the accommodating body 310 comprises a module accommodating space 315 therein and has a shape open toward the top.

The accommodating cover 330 is coupled to the top portion of the accommodating body 310 to form the module accommodating space 315 together. The accommodating cover 330 may comprise a module space cover 335 forming a top face of the module accommodating space 315; and an accommodating lid positioned outside a module space cover 335. In particular, the module space cover 335 may be formed of an insulating member.

Meanwhile, the battery module 200 may be provided in plurality and accommodated in the accommodating body 310. To this end, the battery pack 300 may comprise a plurality of module accommodating spaces, each module accommodating space accommodating a respective one battery module of the plurality of battery modules 200.

Therefore, the accommodating body 310 may comprise a plurality of module accommodating spaces 315 in which each battery module 200 is accommodated to accommodate the plurality of battery modules 200. Therefore, to accommodate the plurality of battery modules 200 in the plurality of module accommodating spaces 315, the number of the plurality of module accommodating spaces 315 may be equal to or greater than the number of the plurality of battery modules 200.

Meanwhile, the battery pack 300 may further comprise a compartment portion 350 for forming the plurality of module accommodating spaces and separating the same from each other. The compartment portion 350 may be located on a bottom face of the battery pack 300. The compartment portion 350 may be disposed along the first direction and the second direction to form the plurality of module accommodating spaces 315 inside the accommodating body 310.

Since the bottom face of the accommodating body 310 has the shape of a single sheet, distortion may easily occur due to an external force. Therefore, the compartment portion 350 may be necessary to reinforce the strength of the bottom face of the battery pack 300. To this end, the compartment portion 350 may be provided in the shape of a beam. In addition, the interior of the compartment portion 350 may be in a hollow state in consideration of the mass moment of inertia.

The compartment portion 350 may comprise a first compartment member (not shown) extending along the first direction to compart the inside of the accommodating body 310; and a second compartment member (not shown) extending along the second direction to compart the inside of the accommodating body 310.

If the module accommodating space 315 is provided in plurality, the accommodating cover 330 may comprise a plurality of module space covers 335 forming each module accommodating space 315; and an accommodating lid 331 located outside of the plurality of module space covers 335 for integrally covering the plurality of module space covers 335.

Figure 3:
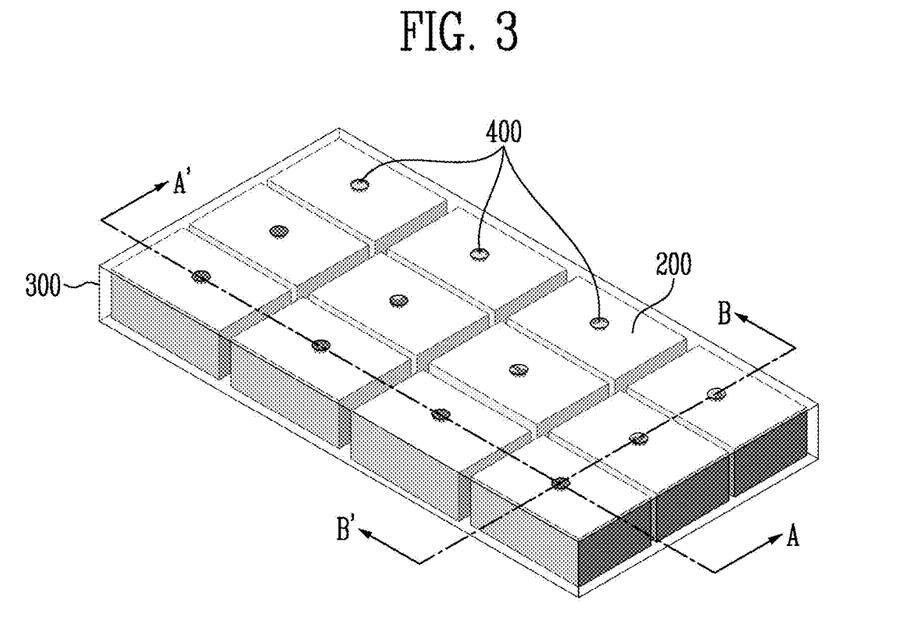
FIG. 3 illustrates a fire extinguishing portion provided in a battery module.

Referring to FIG. 3, the battery pack 300 may comprise a battery module 200 accommodated in the module accommodating space 315 and a fire extinguishing portion spaced apart from the battery module 200 and located above the battery module 200. If the battery pack 300 and the module accommodating space 315 are plural, the fire extinguishing portion 400 may also be provided in plurality, each fire extinguishing portion 400 being located on top of a respective battery module of the plurality of battery modules 200.

The fire extinguishing portion 400 is to suppress a fire when the fire occurs in any one of the battery modules 200 or to prevent or retard the propagation of the fire to other adjacent battery modules 200.

Restraining and suppressing a fire caused by thermal runaway of a battery cell 110 is a problem that is directly related to the stability of the battery pack 300 and further, to the stability of a product in which the battery pack 300 may be used. In addition, considering that the size of the battery module 200 is being compacted, suppressing a fire or blocking the propagation of a fire in the unit of the battery module 200 is important.

In particular, independently managing a fire of the battery module 200 provided in the battery pack 300 will allow for the prevention or retardation of the spread of the fire at the battery module 200 to adjacent battery modules 200 in an early stage.

Meanwhile, the battery pack 300 may be provided with various electronic sensors to detect fire. However, this may be undesirable considering the malfunction of electronic sensors due to a fire and the time required until the electronic sensors detect the fire. In addition, in consideration of the trend of the battery pack 300 becoming compact, the volume of a fire extinguishing agent 420 (see FIGS. 4A and 4B) to be used in the fire extinguishing portion 400 should also be taken into account.

To this end, the fire extinguishing portion 400 may preferably be implemented on a principle that enables the fire extinguishing portion 400 itself to operate immediately in the event of a fire, rather than operating through a control unit after an electronic sensor detects the fire.

To this end, the battery pack 300 described in the present disclosure may comprise a fire extinguishing portion 400 responding to a temperature change that may first occur before or after a fire. In addition, the present disclosure relates to a battery pack 300 comprising a fire extinguishing portion 400 considering the volume of a fire extinguishing agent 420 (see FIGS. 4A and 4B).

Referring to FIG. 3, the fire extinguishing portion 400 may be spaced apart from the battery module 200 and located above the battery module 200. Therefore, when the battery module 200 is provided in plurality, the fire extinguishing portion 400 is also provided in plurality and located above each of the battery modules 200.

The fire extinguishing portion 400 may be located above the center of the battery module 200. In other words, at the accommodating cover 330 having an approximately rectangular shape in the first direction and the second direction, the fire extinguishing portion 400 may be spaced apart from the center of the accommodating cover (center of the rectangle). This is to ensure that a fire extinguishing agent accommodated in the fire extinguishing portion 400 is evenly distributed in the battery module 200.

Figure 4A:
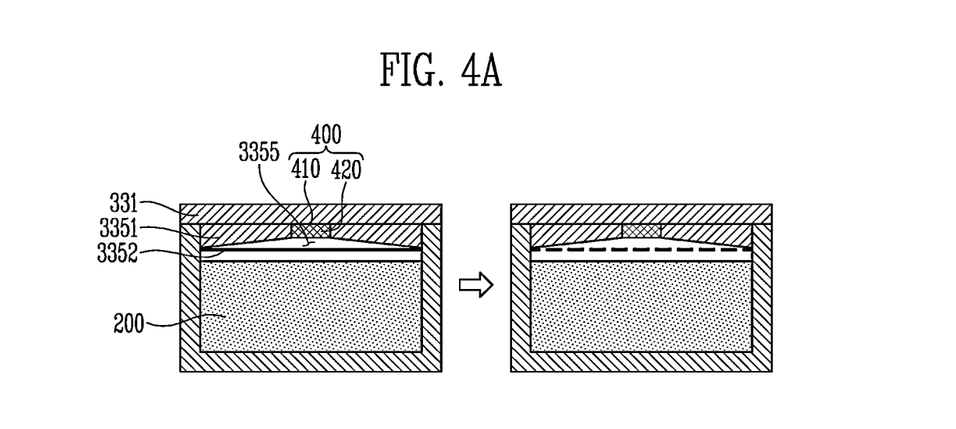
FIGS. 4A and 4B illustrate an example in which a variable portion disappears when the temperature of a module accommodating space is equal to or higher than a preset second temperature.
Figure 4B:
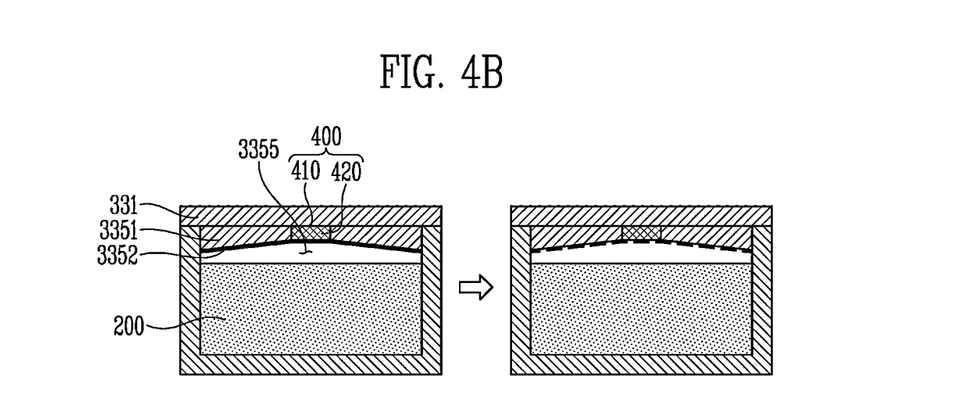
Figure 5A:
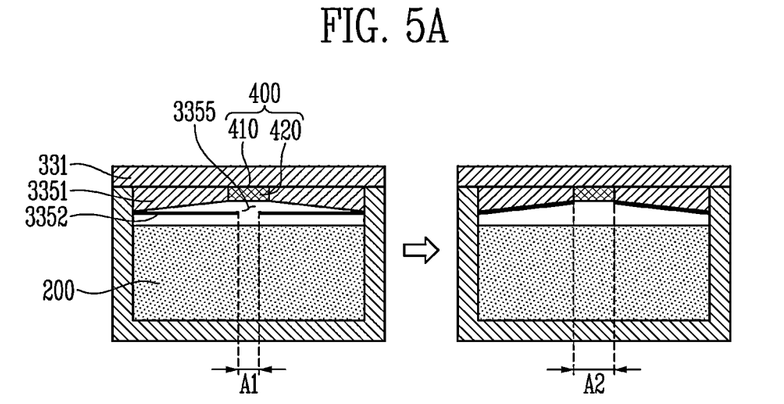
FIG. 5A illustrates an example in which the shape or length of a variable portion changes when the temperature of the module accommodating space is equal to or higher than a preset second temperature.
Figure 5B:
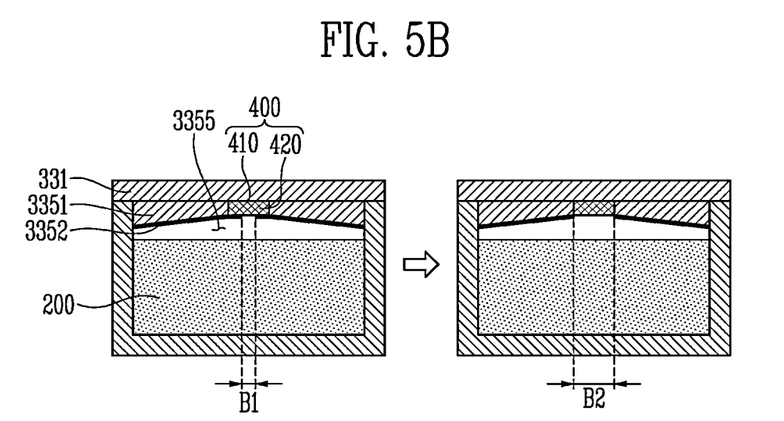
FIG. 5B illustrates another example in which the shape or length of a variable portion changes when the temperature of the module accommodating space is equal to or higher than a preset second temperature.

Cross-sections of the battery module 200 shown in FIGS. 4A, 4B and 5 represent the cases where the fire extinguishing portion 400 is spaced apart from the top side of the center of the battery module 200, particularly from the top side of the center of the accommodating cover 330.

Referring to FIG. 4A, the fire extinguishing portion 400 may comprise a fire extinguishing agent 420 for suppressing a fire; and a fire extinguishing accommodating portion 410 accommodating the fire extinguishing agent 420.

The fire extinguishing accommodating portion 410 may be formed of a material that can melt at a temperature equal to or higher than a preset first temperature. For example, if the first temperature is equal to or higher than 200° C., the fire extinguishing accommodating portion 410 may be made of a heat-resistant material such as a polyolefin-based, polyimide-based, or polyamide-based material. In addition, the material of the fire extinguishing accommodating portion 410 may be a mixture of different composite materials rather than a single material. For example, the material of the fire extinguishing accommodating portion 410 may be a mixture of different types of polymer materials or a mixture of functional particles such as fillers.

In addition, the fire extinguishing accommodating portion 410 may be formed of a single layer of material or may be formed of a plurality of stacked layers. In addition, the plurality of layers may be made of different materials.

A fire extinguishing agent 420 accommodated in the fire extinguishing accommodating portion 410 may discharge a non-flammable gas and/or contain an ingredient having flame retardancy to suppress or retard a fire at a temperature equal to or higher than the first temperature. Therefore, the fire extinguishing portion 400 may supply the fire extinguishing agent 420 toward the module accommodating space 315 at a temperature equal to or higher than the first temperature to suppress, retard, or block the fire occurring in the battery pack 300.

The fire extinguishing agent 420 may comprise any one selected from sodium azide, a phosphorus-based compound, a melamine-based compound, a silicon-based compound, an antimony-based compound, or a metal hydrate-based compound.

In addition, the fire extinguishing agent 420 may be of a liquid or a solid in the form of powder in consideration of the volume.

Sodium azide (NaN3) is a stable compound that is not ignited at a high temperature of about 350° C. and that does not explode even under an external shock, and is a material that does not cause any problem even when stored inside the battery pack for a long time. In addition, sodium azide vigorously reacts with iron (III) oxide (Fe2O3–) to generate a large amount of nitrogen gas within 0.03 seconds while reacting as shown in Formula 1 below. It is generally known that about 65% of the initial mass of sodium azide is decomposed into nitrogen.

$$6NaN2(s)+Fe2O3(s)\rightarrow 2Na2O(s)+2Fe(s)+9N2(g) \quad \text{[Formula 1]}$$

Nitrogen gas is a non-flammable gas and is one of the gases that do not combust itself and that do not have the property of combusting other substances. Since the module accommodating space 315 is filled with nitrogen gas by the reaction according to Formula 1, the module accommodating space will lack oxygen. In other words, since the partial pressure of oxygen in the module accommodating space 315 is lowered, a fire can be blocked, suppressed, or retarded.

Sodium azide can also generate nitrogen by reacting with molybdenum disulfide or sulfur compounds.

In addition, the fire extinguishing agent may be at least one selected from the group of phosphorus-based compound, nitrogen-based compound, silicon-based compound, halogen-based compound, or metal hydrate-based compound.

Representative examples of the flame retardant phosphorus-based compound include phosphate ester, red phosphorus, and ammonium polyphosphate (APP). The flame retardant phosphorus compound can form char by dehydration or carbonization to block oxygen and prevent the spread of flame.

Representative examples of the flame retardant nitrogen-based compound are guanidine compound and melamine-based compound. The flame retardant nitrogen-based compound can improve flame retardancy, since the nitrogen generated during combustion dilutes oxygen. In particular, guanidine and melamine may be provided in the form of powder to be used as the fire extinguishing agent 420.

Examples of the flame retardant silicone-based compound include silicone polymer powder, which is combined with oxygen and carbon due to combustion to form char and a composite inorganic layer, thereby increasing the flame retardant effect.

The flame retardant halogen-based compound may comprise a compound comprising bromine or chlorine, or a fluoroketone. The flame retardant halogen-based compound can stop a combustion reaction because radicals generated in the combustion process competitively react with oxygen. In particular, the flame retardant halogen-based compound may be mixed with an antimony-based compound to be used.

Other examples of suitable flame retardants comprise zinc borate, molybdenum compound, tin compound, silicon compound, zirconium oxide, copper oxide, and the like, and these may be mixed to be used.

FIGS. 4A, 4B and 5 illustrate a cross-section of any one battery module 200 that may be provided in the battery pack 300.

Referring to FIG. 4A, the module accommodating space 315 accommodates the battery module 200 and is spaced apart from the top side of the battery module 200 so that the fire extinguishing portion 400 may be located.

The fire extinguishing portion 400 may be located in the accommodating cover 330. The fire extinguishing portion 400 may be provided outside the accommodating cover and connected to a through-hole (not shown) penetrating the accommodating cover 330.

However, considering the sealing properties and the size of the battery pack 300, the fire extinguishing portion 400 may preferably be located at an inner surface of the accommodating cover 330.

The fire extinguishing portion 400 may be located at an inner surface of the accommodating cover 330. In addition, as shown in FIG. 4A, the fire extinguishing portion 400 may be provided by being inserted into the accommodating cover 330. The location of the fire extinguishing portion 400 may be changed in consideration of the size of the module accommodating space 315.

The fire extinguishing portion 400 may be located at an inner surface of the accommodating cover 330 to form a coplanar surface with the inner surface of the accommodating cover 330.

Alternatively, the fire extinguishing portion 400 may be inserted at an inner surface of the accommodating cover 330 to protrude from the inner surface of the accommodating cover 330.

As described above, the fire extinguishing portion 400 may be disposed such that at least one surface of the fire extinguishing accommodating portion 410 containing a fire extinguishing agent 420 therein faces the battery module 200. This is to supply or disject (disperse) the fire extinguishing agent 420 to the outside of the fire extinguishing accommodating portion 410 as the fire extinguishing accommodating portion 410 starts to melt at the first temperature.

Meanwhile, the battery pack 300 may further comprise a variable portion 3352 that is located between the fire extinguishing portion 400 and the battery module 200 to spatially separate the fire extinguishing portion 400 from the battery module 200.

The variable portion 3352 is to protect the fire extinguishing portion 400 just in case. However, when a fire occurs, the fire extinguishing agent 420 should be disjected or supplied toward the battery module 200 where the fire has occurred. Therefore, the shape or length of the variable portion 3352 may be changed at a preset second temperature that is lower than the first temperature.

Therefore, after a fire occurs, when the temperature of the module accommodating space 315 reaches the first temperature, the shape or length of the variable portion 3352 is changed to expose the fire extinguishing portion 400 to the module accommodating space 315. Afterward, when the temperature of the module accommodating space 315 reaches the second temperature, the fire extinguishing accommodating portion 410 will start to melt and the fire extinguishing agent 420 will fall toward the battery module 200.

The reason why the fire extinguishing portion 400 is spaced apart from the top side of the battery module 200 is to consider gravity, but since the variable portion 3352, the fire extinguishing agent 420, and the fire extinguishing accommodating portion 410 all respond to temperature, the fire extinguishing portion 400 does not need to be spaced apart from the top side of the battery module 200. In other words, if a part of the module accommodating space 315 can be used, the size of the battery pack 300 does not need to be increased, and so the fire extinguishing portion 400 and the variable portion 3352 can be located anywhere as long as the fire extinguishing agent 420 can be supplied to the battery module 200.

Referring to FIG. 4A, the variable portion 3352 may be located between the fire extinguishing portion 400 and the battery module 200. Referring to FIG. 4B, the variable portion 3352 may be located at an inner surface of the fire extinguishing portion 400 and the accommodating cover 330. In addition, after placing the fire extinguishing portion 400 on the accommodating cover 330, the variable portion 3352 may be formed by coating the top to form a coating layer. Specifically, the variable portion 3352 may be formed as a coating layer on a portion of the surface of the fire extinguishing portion 400 facing the battery module and the rest of the inner surface of the accommodating cover 330 except for the position where the fire extinguishing portion 400 is located.

Referring to FIGS. 4A and 5A, the variable portion 3352 may be made of a material of which shape or length changes when the temperature of the module accommodating space 315 reaches the second temperature. FIG. 4A illustrates an example in which the variable portion 3352 is made of a material that melts at the second temperature and so the shape changes, and FIG. 5A illustrates an example in which the variable portion 3352 is made of a thermally contracting material of which length changes at the second temperature. For example, the thermally contracting material may include an insulating polymer. For example, the thermally contracting material may include silicone rubber, natural rubber, fluoro elastomers, ethylene-propylene diene monomer-class rubber (EPDM rubber), hydrogenated acrylonitrile butadiene rubber (HNBR), nitrile-butadiene rubber (NBR), and/or styrene butadiene rubber (SBR).

As an example of the present disclosure, the second temperature may be set to 150° C. Therefore, the material of the variable portion 3352 may be formed of a material of which shape or length changes at 150° C.

Consequently, the first temperature may be referred to as a preset supply temperature at which the fire extinguishing agent 420 is disjected or supplied by the change of the shape of the fire extinguishing accommodating portion 410, and the second temperature may be referred to as a preset variable temperature at which the shape or material of the variable portion 3352 is changed.

Therefore, the first temperature may alternatively be referred to as the supply temperature and the second temperature as the variable temperature.

In addition, the variable portion 3352 may be formed of an electrically insulating material. This is to insulate between the accommodating cover 330 and the battery module 200.

Referring to FIGS. 4A to 5B, the accommodating cover 330 may further comprise a recessed portion 3355 recessed in a direction away from the battery module 200. In addition, the fire extinguishing portion 400 may be located in the recessed portion 3355. This is to utilize the remaining space except for the space occupied by the battery module 200 because the module accommodating space is narrow.

Specifically, the accommodating cover 330 may comprise an insulating part 3351 located at a surface of the accommodating cover 330 located toward the battery module 200 from an inner surface of the accommodating cover 330; and a recessed portion 3355 that is formed as the insulating part 3351 is recessed in a direction away from the battery module 200. In addition, the fire extinguishing portion 400 is located in the recessed portion 3355.

The recessed portion 3355 may be formed by being recessed upward from one surface of the insulating part. Alternatively, referring to FIG. 4A, the recessed portion 3355 may be formed such that the recessed portion 3355 is inclined toward the fire extinguishing portion 400. In other words, the recessed portion 3355 may be inclined in a direction away from the battery module 200 from the circumference of the top face of the module accommodating space 315 toward the center.

Referring to FIG. 4A, the fire extinguishing portion 400 may be located in the recessed portion 3355 to form a coplanar surface with the insulating part 3351. Alternatively, the fire extinguishing portion 400 may be located in the recessed portion 3355 in a form protruding from the insulating part 3351.

FIGS. 4A to 5B illustrate an example in which the fire extinguishing portion 400 is located in one module accommodating space. Therefore, if the battery pack 300 comprises a plurality of module accommodating spaces 315, the battery modules 200 may also be provided in plurality and each accommodated in the module accommodating spaces 315. Similarly, the fire extinguishing portion 400 and the variable portion 3352 are also provided in the same number as the number of the module accommodating spaces 315 and located on top of each of the battery module 200.

Referring to FIG. 4A, the variable portion 3352 may compart between the fire extinguishing portion 400 and the battery module 200 in the module accommodating space 315. The variable portion 3352 may be melted to be removed when the second temperature is reached, as shown in the right figure.

Referring to FIG. 4B, the variable portion 3352 may be of a stacked form along the inclined face of the insulating part 3351. In other words, the variable portion 3352 may be coated and stacked on an inner face of the fire extinguishing portion 400 and the accommodating cover 330. The stacked form of the variable portion 3352 may be of a form attached to the insulating part 3351 like a coating layer, or simply arranged side by side along an inner face of the accommodating cover 330 or along an inner face of the insulating part 3351.

Likewise, the stacked variable portion 3352 may be melted and removed when the second temperature is reached, as shown in the right figure.

Referring to FIGS. 5A and 5B, the variable portion 3352 may comprise a hole (not shown) formed therethrough to expose a portion of the fire extinguishing portion 400 toward the battery module 200 as much as a preset first area A1. This is to cause the variable portion 3352, when the variable portion 3352 is made of a thermally contracting material, to contract toward the circumference of the accommodating cover 330, rather than the center thereof, during thermal contraction.

Referring to FIG. 5A, when the temperature of the module accommodating space 315 reaches the second temperature, the variable portion 3352 may contract toward an inner face of the module accommodating space 315. Therefore, the size of the first area A1 (shown in the left figure) may be changed to a preset second area A2 (shown in the right figure) instead of the size of the first area A1.

In other words, when a first temperature is reached, the variable portion 3352 may be deformed such that the size of the hole (not shown) formed through the variable portion 3352 is increased to the size of the second area.

Therefore, the fire extinguishing portion 400 is exposed as much as the size of the first area when viewed from the battery module 200, and when the second temperature is reached, the fire extinguishing portion 400 is exposed as much as the size of the second area A2 due to the contraction of the variable portion 3352.

Referring to FIG. 5A, the variable portion 3352 is located between the fire extinguishing portion 400 and the battery module 200, and when the second temperature is reached, as the variable portion 3352 contracts, the variable portion 3352 may move toward an inner face of the accommodating cover 330 or the insulating part 3351 and come into contact with an inner face of the accommodating cover 330 or an inclined face of the insulating part 3351.

In other words, the variable portion 3352 is located at a first preset position (between the fire extinguishing portion 400 and the battery module 200) and may move to a preset second position (an inclined inner face of the accommodating cover 330) when the second temperature is reached.

In addition, the position change of the variable portion 3352 is possible by a force caused by thermal contraction.

Referring to FIG. 5B, to support the variable portion 3352 and guide a direction during thermal contraction, the variable portion 3352 may be located along an inclined inner face of the accommodating cover 330 or the inclined insulating part 3351. Thereafter, when the second temperature is reached, the variable portion 3352 may contract along an inclination direction.

Therefore, as in FIG. 5A, the size of a hole formed in the variable portion 3352 may be increased from a first area B1 (shown in the left figure) to a second area B2 (shown in the right figure).

Figure 6:
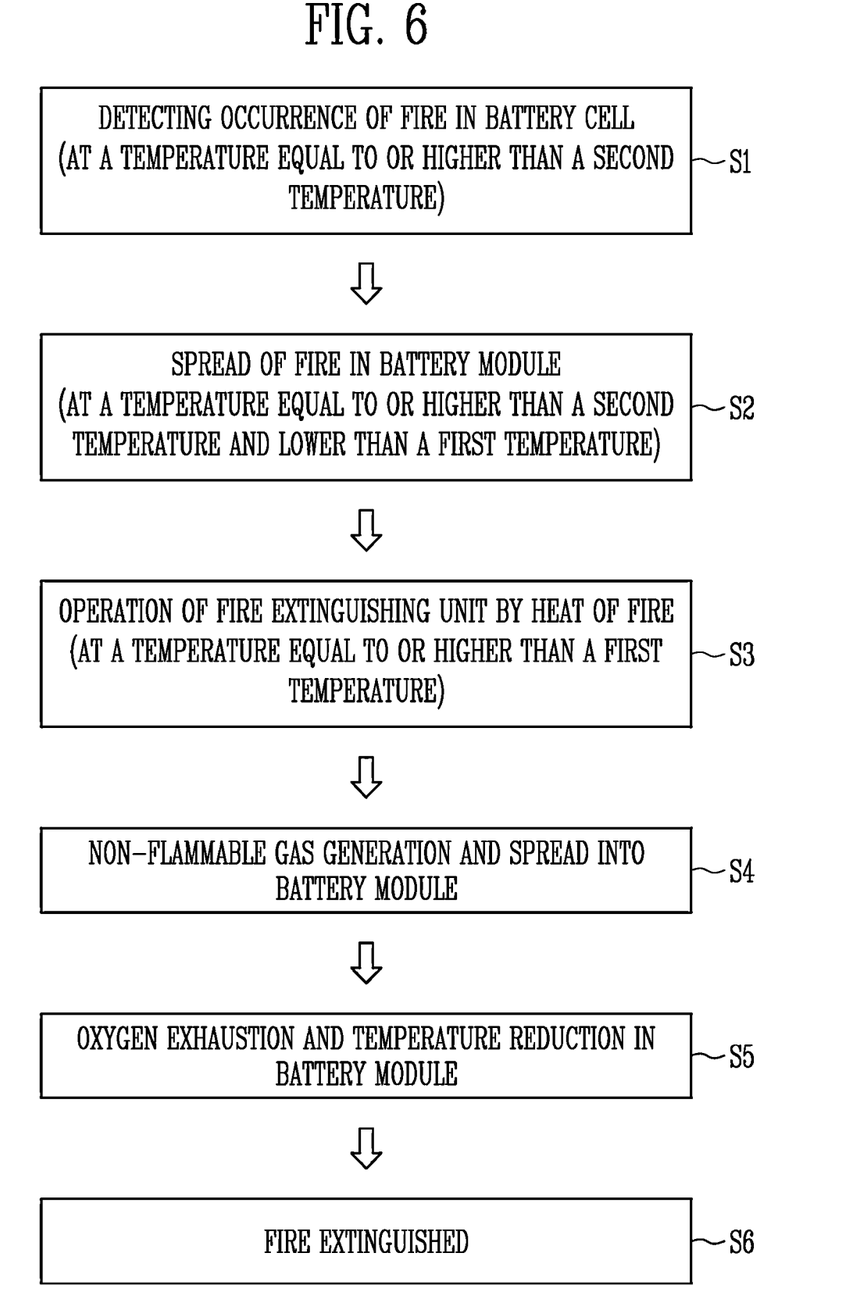
FIG. 6 schematically illustrates a fire extinguishing mechanism described in the present disclosure.

FIG. 6 illustrates the operation principle of the variable portion 3352 and the fire extinguishing portion 400. A battery module 200 including thermal runaway of a specific battery cell 110 increases the temperature of the module accommodating space 315 where the battery module 200 is located.

When the temperature of the module accommodating space 315 reaches a preset second temperature (S1), as the length or shape of the variable portion 3352 changes, the fire extinguishing portion 400 may be exposed toward the battery module 200.

The variable portion 3352 covers the accommodating cover 330 and the fire extinguishing portion 400, but may not completely cover such that the fire extinguishing portion 400 may not be exposed toward the battery module 200. This is to guide a contracting direction when the variable portion 3352 is thermally contracted.

At a temperature equal to or higher than the second temperature, the variable portion 3352 exposes the fire extinguishing portion 400 toward the battery module 200, but the fire extinguishing portion 400 is not yet operating.

If a fire of the battery module 200 spreads, the temperature of the module accommodating space 315 will obviously continue to increase (S2).

In addition, when the temperature of the module accommodating space 315 reaches a preset first temperature, the fire extinguishing accommodating portion 410 disappears and the fire extinguishing agent 420 accommodated therein may be disjected or supplied toward the battery module (S3).

If the fire extinguishing agent 420 is a nitrogen-based compound or sodium azide, the fire extinguishing agent will generate nitrogen in the module accommodating space 315 through a chemical reaction (S4). Therefore, the amount of oxygen required for combustion in the module accommodating space 315 rapidly decreases, and the temperature of the module accommodating space 315 also drops (S5). Through this, a fire of the battery module 200 can be suppressed (S6) or the spread to an adjacent battery module 200 can be retarded.

Alternatively, in some embodiments a flame retardant may be disjected or supplied to the battery to form a char or layer on the battery cells 110 to suppress the fire and/or prevent spread of the fire to an adjacent battery module.

In addition, since the battery module 200 has the fire extinguishing portion 400 independently, even when a fire occurs in a plurality of battery modules 200, the fire of the battery module 200 can be independently suppressed or retarded.

The scope of the present disclosure, which may be implemented in various forms, is not limited to the Examples described above. Therefore, if a modified Examples includes elements of the claims of the present disclosure, it should be regarded as belonging to the scope of the present disclosure.

What is claimed is:

1. A battery pack comprising:
    a battery module comprising one or more battery cells;
    an accommodating body accommodating the battery module;
    an accommodating cover coupled to the accommodating body to form, together with the accommodating body, a module accommodating space in which the battery module is accommodated;
    a fire extinguishing portion provided in the accommodating cover and configured to supply a fire extinguishing agent accommodated therein to the module accommodating space when the temperature of the module accommodating space is equal to or higher than a preset first temperature; and
    a variable portion located between the battery module and the fire extinguishing portion and regulating the accommodating cover from contacting the module accommodating space, and of which shape or length is changed to expose the fire extinguishing portion toward the battery module when the temperature of the module accommodating space reaches a preset second temperature which is lower than the first temperature,
    wherein the accommodating cover comprises an insulating part located toward the battery module from an inner surface of the accommodating cover,
    wherein a recessed portion is formed by recessing the insulating part in a direction away from the battery module,
    wherein the fire extinguishing portion is located in the recessed portion,
    where the variable portion includes a hole, and
    when the temperature of the module accommodating space reaches the preset second temperature, a size of the hole increases, and the variable portion moves toward the insulating part and contacts an inclined surface of the insulating part.

2. The battery pack according to claim 1, wherein the variable portion is located at the inner surface of the accommodating cover to cover at least a portion of the fire extinguishing portion.

3. The battery pack according to claim 2, wherein the variable portion is made of a thermally contracting material.

4. The battery pack according to claim 1, wherein the variable portion is attached to and stacked on an inner surface of the recessed portion at a temperature equal to or higher than the second temperature.

5. The battery pack according to claim 1, wherein the insulating part is inclined toward the fire extinguishing portion.

6. The battery pack according to claim 1, wherein the insulating part is inclined toward the fire extinguishing portion from the circumference of the insulating part toward the center of the insulating part.

7. The battery pack according to claim 1, wherein the fire extinguishing portion comprises a fire extinguishing accommodating portion containing the fire extinguishing agent therein, wherein the fire extinguishing accommodating portion supplies the extinguishing agent to the outside of the fire extinguishing accommodating portion at a temperature equal to or higher than the first temperature.

8. The battery pack according to claim 7, wherein the fire extinguishing agent is a liquid or a solid in the form of powder.

9. The battery pack according to claim 8, wherein the fire extinguishing agent comprises at least one selected from sodium azide, a phosphorus-based compound, a nitrogen-based compound, a silicon-based compound, a halogen-based compound, or a metal hydrate-based compound.

10. The battery pack according to claim 8, wherein the fire extinguishing agent generates a non-flammable gas in the module accommodating space.

11. The battery pack according to claim 1, wherein the variable portion comprises a thermally contracting material.

12. The battery pack according to claim 11, wherein the variable portion is made of an electrically insulating material.

13. The battery pack according to claim 1, wherein the variable portion is stacked on an inner surface of the fire extinguishing portion and the accommodating cover.

14. The battery pack according to claim 1, wherein an area of the variable portion where the fire extinguishing portion is exposed toward the battery module is changed from a predetermined first area to a predetermined second area, which is larger than the predetermined first area, at a temperature equal to or higher than the second temperature.

15. The battery pack according to claim 1, wherein the variable portion is melted at a temperature equal to or higher than the second temperature.

16. The battery pack according to claim 1, wherein the variable portion moves from a preset first position to a preset second position at a temperature equal to or higher than the second temperature.

17. The battery pack according to claim 1, wherein the battery module, the module accommodating space, the fire extinguishing portion, and the variable portion are each provided in plurality;
   each of the plurality of module accommodating spaces accommodates any one battery module of the plurality of battery modules; and
   the plurality of fire extinguishing portions and the plurality of variable portions are also spaced apart from any one battery module of the plurality of battery modules.

18. The battery pack according to claim 17, wherein the accommodating body comprises a compartment portion forming each of the plurality of module accommodating spaces and separating the same from each other.

* * * * *